3,839,528
WATER AND ORGANIC SOLVENT RESISTANT CELLULOSE ACETATE-METHYLOLATED MELAMINE POLYMER FIBER
Albin Frank Turbak, Convent Station, and John P. Thelman, Kenvil, N.J., assignors to International Telephone and Telegraph Corporation, New York, N.Y.
No Drawing. Filed Oct. 12, 1973, Ser. No. 406,113
Int. Cl. C08g 37/32; D01f 3/38
U.S. Cl. 264—200
10 Claims

ABSTRACT OF THE DISCLOSURE

Cellulose acetate fibers of improved water and organic solvent resistance. The fibers are prepared by mixing cellulose acetate containing free hydroxyl groups, in an acetone spinning solution, with from 2% to 20% by weight of an acetone-soluble methylolated melamine polymer having at least one

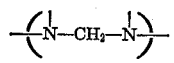

linkage between melamine molecules, a degree of polymerization of between 2 and 10 and between 30 and 80% of its free methylol groups alkylated with a 1 to 4 carbon atom alkyl group. Fibers are spun from the solution and heat set in fiber of fabric form.

---

This invention relates to a process for improving the properties of cellulose acetate fibers and to the products produced thereby. More specifically, this invention relates to the production of cellulose acetate fibers and fabrics having significantly improved water and organic solvent resistance.

Many attempts have been made to utilize nitrogen-formaldehyde reaction products to improve one or more properties of cellulosic materials. U.S. Pat. 2,995,416, for example, discloses the addition of small amounts of methylol melamines to cellulose esters to obtain, upon heating, a matted cellulosic fiber. U.S. Pats. 2,796,656; 2,858,185 and 3,016,258 describe the addition of methylol monoamide polymers to viscose solutions to produce regenerated cellulose articles of reduced water-sensitivity. However, the polymers shown in these patents are not only chemically different from those of the present invention but also are soluble in acetone and hence are not useful in the production of acetone soluble cellulose esters.

U.S. Pat. 2,426,370 discloses a coating composition containing cellulose acetate blended with a 3 to 8 carbon atom alkylated melamine-formaldehyde resin. The compositions, particularly when mixed with an alkyd resin are stated to produce coatings and films of improved properties. However, the compositions there disclosed are fully alkylated and while they may be useful in paint coating compositions, they are unsuitable for use in textile fibers.

U.S. Pat. 2,684,343 discloses the addition of alkylated polymethylol melamine resins to cellulose solutions to produce viscose rayon of decreased water absorption. However, here again, the melamine resins disclosed are largely water soluble and acetone insoluble and hence not useful with acetone soluble cellulose acetate.

Therefore, in spite of the many and varied efforts that have been devoted to incorporating melamine-formaldehyde or related nitrogen-containing resins into cellulosic products, none in so far as is known has been successful in the production of a superior cellulose acetate fiber.

It is accordingly a primary object of the present invention to provide a cellulose acetate fiber of improved water and organic solvent resistance by controlled reaction of the acetate with certain melamine resin polymers.

It is an additional object of this invention to provide an improved cellulose acetate fiber which is crosslinked by heat alone without recourse to degradative processes employing acid or other catalysts.

It is still an additional object of this invention to provide cellulose acetate yarns which are crosslinked after the texturing process to form permanently textured yarns.

It is yet an additional object of this invention to provide a cellulose acetate fabric which is made shrink resistant and dimensionally stable by controlled crosslinking of the fabric.

In accordance with the invention, the water-sensitivity, cross-sectional swelling in water, and water retention capacity of cellulose acetate fibers or yarns are decreased by addition to the acetate spinning solution of from 2 to 20% by weight of an acetone-soluble methylolated melamine polymer. The polymer has at least one

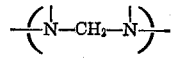

linkage between melamine molecules, a degree of polymerization of between 2 and 10 and between 30 and 80% of its free methylol groups alkylated with a 1 to 4 carbon atom alkyl group. Fibers spun from the foregoing spinning solution can be rapidly heat-set without acid catalysis, either in fiber or fabric form. Further, while the polymer/acetate solution can be safely handled and spun, the subsequently shaped and cured fibers retain texture and crimp and are solvent insoluble. Spinning solution viscosities, yarn dyeability, hand, luster, strength and other normal properties of the acetate are not significantly altered.

The melamine-formaldehyde polymers useful in the invention are commercially available polymers. These resins are sold for use in paints and coatings; in so far as is known, they have never been suggested for use in cellulose acetate fibers in accordance with the present invention. The acetone solubility and the reactivity of the polymers is critical to the success of the invention. Acetone solubility is a function of the proper type and amount of alkyl "capping" in combination with the presence of the

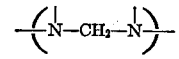

linkage. The reactivity is dependent on both the amount of prepolymerization of the polymer to form

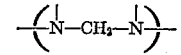

linkages and the amount of free methylol remaining unalkylated. The melamine resins useful in the invention must be true polymers in the sense that they have at least a dimer structure—that is, at least two, and no more than ten, melamine (triazine) rings connected through

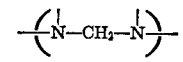

bridges. Preferably the polymers contain from three to six melamine rings connected respectively by from 2 to 5

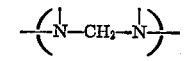

linkages. The available valence on the two nitrogen atoms of this linkage, other than that connected to the melamine molecule, may be hydrogen, —CH$_2$OH or —CH$_2$OR in which R is 1 to 4 carbon alkyl group. Beyond a degree of polymerization of ten, the polymer begins to self-crosslink, is not soluble in acetone and hence is not useful. A preferred degree of polymerization is from 3 to 6.

The polymer is partially "capped" or alkylated both to render the polymer soluble in the acetone solvent and to sufficiently control its reactivity to render it labile through the various processing steps up to and including spinning. At the same time, the polymer must not be alkylated too fully, otherwise its reactivity is insufficient to trigger reaction with the acetate when the fiber or fabric is heat set. Accordingly, the degree of alkylation must be between 30 and 80% of the free methylol groups.

The method of preparation of the melamine polymers is well known and forms no part of the instant invention. Preparation of the polymers is described, for example, in *Encyclopedia of Polymer Science and Technology*, Volume 2, 1965, pages 17 to 21 and in *Industrial and Engineering Chemistry*, Volume 44, November 1952, pages 2679 to 2686. Briefly, they are prepared by reacting melamine with a formaldehyde solution heating to form the polymer, adding a 1 to 4 carbon lower aliphatic alcohol and heating to alkylate the polymer. More than 3 but less than 6 moles of formaldehyde should be used for each mole of melamine, preferably 4 or 5 moles of formaldehyde per mole of melamine. The proper amount of the alcohol should then be added per each mole of methylol to assure from 30% to 80% capping which is from 1.5 to 3.0 moles of alcohol per mole of melamine.

From 2% to 20% by weight of the foregoing melamine polymer is added to a cellulose acetate spinning solution prepared in known fashion. The cellulose acetate solution contains cellulose acetate having free hydroxyl groups dissolved in an acetone solvent. The cellulose acetate is a diacetate having a degree of substitution of acetyl groups of from 2.05 to 2.77 or from 35.5% to 42.8% acetyl groups based on the weight of cellulose acetate. After addition of the polymer to the solution, the mixture is stirred, filtered, deaerated, spun and the spun fiber stretched, all in known fashion. The preparation of such cellulose diacetate spinning solutions and the spinning of fibers therefrom is more fully described, for example, in *Encyclopedia of Polymer Science and Technology*, Volume 3, 1965, pages 432 to 435. Reference to this text should be made for a more detailed description of the preparation of the acetate fibers. The fibers may then be textured or crimped. Such processes are also well known to those skilled in the art. Suitable methods of texturing or crimping fibers are disclosed, for example, in U.S. Pats. 2,575,837; 2,575,839; and 3,012,397 and in *Woven Stretch and Textured Fabrics*, B. L. Hawthorne, John Wiley & Sons, 1964.

The fibers are then heat set to crosslink and react the cellulose acetate-melamine polymer in either fiber or fabric form. The temperatures and times of heat setting are dependent on each other, on the specific melamine polymers used including their degree of reactivity, the yarn denier and the resin concentration. In general, heat setting or curing may be accomplished by bringing the yarn to from 150° C. to 250° C., preferably from 175° C. to 230° C., in hot air—as in an oven or between hot wires—or in an oil bath such as a silicone oil. The time may vary from a few seconds to an hour or more, generally from 5 seconds to 45 minutes. At higher temperatures, e.g. 220° C., times of from 5 to 15 seconds are adequate. At lower temperature, e.g. 175° C., times of 5 to 15 minutes should be used. At intermediate temperatures, e.g. 200° C., from 1 to 2 minutes has been found adequate.

It is important to note that curing of the fibers of the invention occurs rapidly and needs no acid or other catalysis. The fibers are cured with heat alone. This is an important advantage because acid catalysis, including even a mild acid, normally degrades the acetate fiber, reducing its strength and leading to yellowing or other coloring problems with the fiber.

An important advantage of the heat set products of the invention, in addition to their water and organic solvent resistance, are their shrink resistance and dimensional stability. The heat set cellulose acetate yarns or fabrics of the invention will retain their shape and textured crimped condition after repeated laundering, a property heretofore generally associated with heat set nylons and polyesters. Moreover, the acetate yarns of the invention retain their outer hydrophilic nature and thus combine comfort with shrink resistance and dimensional stability.

The following examples illustrate the practice of the invention. All parts and percentages are by weight.

EXAMPLE 1

A solution is prepared by dissolving 970 grams of cellulose acetate (910 grams oven dry, 39.4% acetyl) in 2,870 grams of acetone. Total solution water content is adjusted to 2%. Mixing is accomplished using a helical mixer over a 16 hour period. To this solution is added 60 grams of a commerically available melamine-formaldehyde polymer (100% solids) in 100 grams of acetone. The polymer is prepared from 3.2 moles of formaldehyde for each mole of melamine with approximately 2 moles of methanol used in capping. The polymer has a degree of polymerization of 2, an approximate molecular weight of 380, is 72% alkylated with methyl groups and contains 28% free methylol groups. After addition of the polymer, the resulting mixture is stirred for an additional 4 hours prior to a double stage pressure filtration. The solution is then deaerated on standing for 12 hours. The resulting acetone spin dope is then spun through a 40 hole (0.06 mm.) spinnerette at a head pressure of 300 to 400 p.s.i.g. with a head temperature of 60 to 70° C. Jetting rate is approximately 30 ml./min. with a takeup of 1,100 linear feet/minute. This yields a stretch of 14%. Cell jacket temperature is maintained at 115° C. during spinning. The resultant 200 denier acetate yarn is twisted at 2.5 turns/inch.

EXAMPLE 2

The procedure of Example 1 is followed except that 75 grams of a melamine resin polymer (80% solids) was added to 85 grams of acetone. The melamine polymer is prepared from 5 moles of formaldehyde for each mole of melamine with approximately 3 moles of methanol used in capping. The polymer has a degree of polymerization of 4, an approximate molecular weight of 1,100 is 70% alkylated with methyl groups and contains 30% free methylol groups.

EXAMPLE 3

The procedure of Example 1 is again followed except that 120 grams of a melamine resin polymer (50% solids) was added in 40 grams of acetone. The melamine polymer is prepared from 4 to 4.5 moles of formaldehyde for each mole of melamine with approximately 2 moles of isobutanol used in capping. The polymer has a degree of polymerization of 5, an approximate molecular weight of 1,800, is 60% alkylated with butyl groups and contains 40% free methylol groups.

EXAMPLE 4

As a control, an additional yarn sample was prepared in accordance with the procedure of Example 1 except that no melamine resin was added. An additional 60 grams of cellulose acetate in 100 grams of acetone was added in place of the melamine resin.

All of the fibers of Examples 1 through 4 were heat set in both yarn and fabric form. Heat setting was carried out until solubility of the yarn or fabric in acetone did not appreciably decrease. In general, the yarns were heat set in a forced air oven at a temperature of 175° C. to 220° C. for from 5 seconds to 45 minutes. Fabrics knit from the yarns, prior to cure, were heat set at similar temperatures for from 5 seconds to 25 minutes. Properties of the heat set yarns and fabrics are set forth in the following Table. The "relative cure rate" was measured on a scale of 1 to 10 as determined at 220° C. in silicone oil for times ranging from 5 seconds to 2 minutes.

| Ex. No. | Resin type | Resin (percent) | Relative cure rate [a] | Heat set fabric (percent) | | Heat set yarn | | | |
|---|---|---|---|---|---|---|---|---|---|
| | | | | Acetone solubility | Water retention [b] | Wet elongation minus dry elongation (percent) | Fiber cross-sectional area increase on wetting (percent) | Tenacity (grams/denier) | |
| | | | | | | | | Conditioned | Wet |
| 1 | Melamine-formaldehyde, low capping (methyl), low M.W. | 6 | 3 | 17 | 19.0 | 10.5 | | 1.43 | 0.87 |
| 2 | Melamine-formaldehyde, medium capping (methyl), medium M.W. | 6 | 1 | 7 | 15.0 | 6.3 | 1.3 | 1.46 | 0.90 |
| 3 | Melamine-formaldehyde medium capping (butyl), high M.W. | 6 | 4 | 10 | 17.5 | 5.4 | 1.2 | 1.36 | 0.79 |
| 4 | None | | | 97 | 21.0 | 9.2 | 12.5 | 1.46 | 0.98 |

[a] 1 fastest, 10 slowest.
[b] Percent water weight retained after centrifuging vs. after dried.

The Table shows that the samples of fabrics prepared in accordance with the invention all had lower water retention and considerably lower acetone solubility than control Example 4. In addition, Examples 2 and 3, which used melamine polymers having a degree of polymerization of 4 and 5 respectively and which represent preferred embodiments of the invention, show a considerably reduced wet elongation and fiber cross-sectional area increase on wetting. These results demonstrate the marked reduction of water sensitivity of the yarns.

EXAMPLE 5

An additional sample is prepared by following the procedure of Example 1 but using a melamine-formaldehyde polymer having a degree of polymerization of four, a molecular weight of 1,200, containing 35% butyl capping and 65% free methylol groups. The results are substantially similar to those set forth for Example 2 in cure rate, organic solvent resistance and water sensitivity. The higher proportion of free methylol groups offsets the longer alkyl chain in the capping group and hence the reactivity of the polymer and the cure rate properties of the fiber are essentially similar.

We claim:

1. A process for preparing a cellulose acetate fiber having improved water and organic solvent resistance comprising
    mixing cellulose acetate containing free hydroxyl groups, dissolved in an acetone spinning solution, with from 2% to 20% by weight of an acetone-soluble methylolated melamine polymer, said polymer having at least one

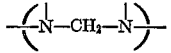

linkage between melamine molecules, a degree of polymerization of between 2 and 10 and between 30% and 80% of its free methylol groups alkylated with a 1 to 4 carbon atom alkyl group,
    spinning a fiber from said solution, and
    heat setting said fiber.

2. The process of Claim 1 in which the polymer is prepared from melamine and formaldehyde, the mole ratio of formaldehyde to melamine in the polymer being more than 3 but less than 6.

3. The process of Claim 1 in which the degree of polymerization of the melamine polymer is from 3 to 6.

4. The process of Claim 1 in which the melamine polymer is alkylated with from 1.5 to 3.0 moles of a 1 to 4 carbon aliphatic alcohol.

5. The process of Claim 1 in which the fiber is textured prior to heat setting.

6. The process of Claim 1 in which a fabric is prepared from the fiber prior to heat setting and the fabric is then heat set.

7. A cellulose acetate fiber having improved water and organic solvent resistance comprising
    the heat set fiber spun from an acetone solution of a mixture of cellulose acetate containing free hydroxyl groups and 2% to 20% by weight of an acetone-soluble methylolated melamine polymer, said polymer having a least one

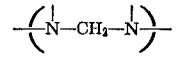

linkage between melamine molecules, a degree of polymerization of between 2 and 10 and between 30% and 80% of its free methylol groups alkylated with a 1 to 4 carbon atom alkyl group.

8. The fiber of Claim 7 in which the fiber is heat set in a permanently textured condition.

9. The fiber of Claim 7 which is heat set in fabric form.

10. The fiber of Claim 7 in which the melamine polymer has a degree of polymerization of from 3 to 6.

References Cited

UNITED STATES PATENTS

| | | | |
|---|---|---|---|
| 2,317,131 | 4/1943 | Conaway | 260—15 |
| 2,375,838 | 5/1945 | Collidge et al. | 260—15 |
| 2,684,343 | 7/1954 | Dixon et al. | 260—15 |
| 2,706,718 | 4/1955 | Dixon et al. | 260—15 |
| 2,995,416 | 8/1961 | Ernst | 264—115 |
| 3,491,037 | 1/1970 | Keys et al. | 260—15 |

WILLIAM H. SHORT, Primary Examiner

E. WOODBERRY, Assistant Examiner

U.S. Cl. X.R.

260—15, 264—176 F